United States Patent [19]
Liu

[11] Patent Number: 6,032,896
[45] Date of Patent: Mar. 7, 2000

[54] INTERMITTENT STOP DEVICE FOR TAPE MEASURES

[76] Inventor: Simon Liu, P.O. Box 82-144, Taipei, Taiwan

[21] Appl. No.: 09/078,513

[22] Filed: May 14, 1998

[51] Int. Cl.[7] .......................... B65H 75/30; B65H 75/48; G01B 3/10
[52] U.S. Cl. .......................... 242/381.6; 242/379; 33/767
[58] Field of Search .............................. 242/381.6, 396.7, 242/379, 405, 405.3; 33/754, 767

*Primary Examiner*—John Q. Nguyen
*Attorney, Agent, or Firm*—A & J

[57] ABSTRACT

An intermittent stop device for tape measures includes a gradually raised gill portion provided at a side edge of a top portion of the housing of a tape measure. The gill portion is adapted for pressing by a thumb. The gill portion has a central through hole which allows a stop switch to pass through to be exposed on the outside. The stop switch has a base pad capable of contacting one side of a reel inside the tape measure to achieve a frictional stopping function. A lock switch may be provided at the top portion of the housing to position the reel. The gill portion is located at a side edge of the top portion of the housing near the lock switch so that the stop switch is near the lock switch to facilitate pressing by the user with his thumb. Additionally, a stop block may be provided at the inner wall of the housing relative to the stop switch to support the reel wheel when the latter is subject to a side pressure and to achieve a frictional stop function to prevent the reel wheel from becoming eccentric. In addition, a pivot bolt is centrally disposed inside the housing. One end of the pivot bolt is engaged with a screw passing through the center of the housing so that the outer surface of the housing with the pivot bolt is level to facilitate printing thereon.

7 Claims, 4 Drawing Sheets

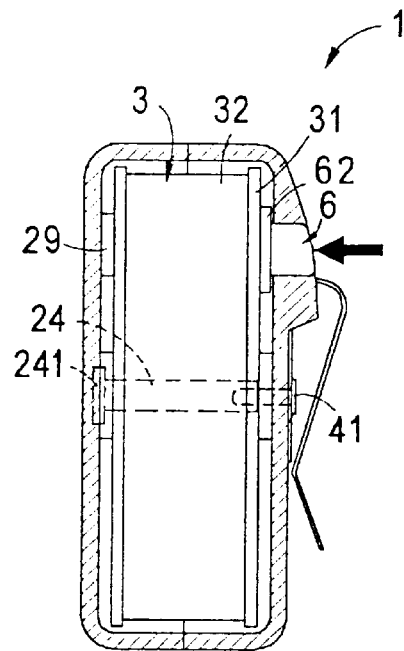
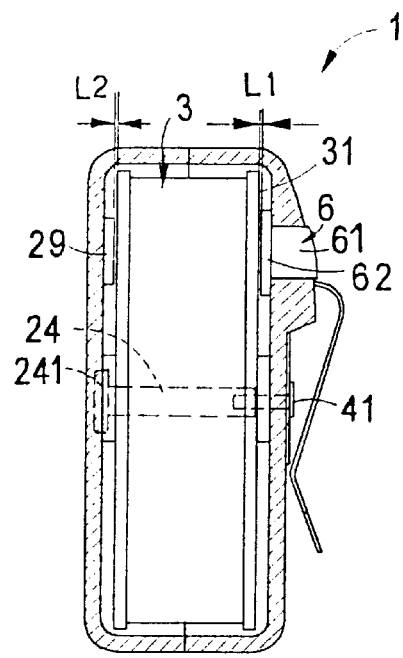
FIG. 4  FIG. 3
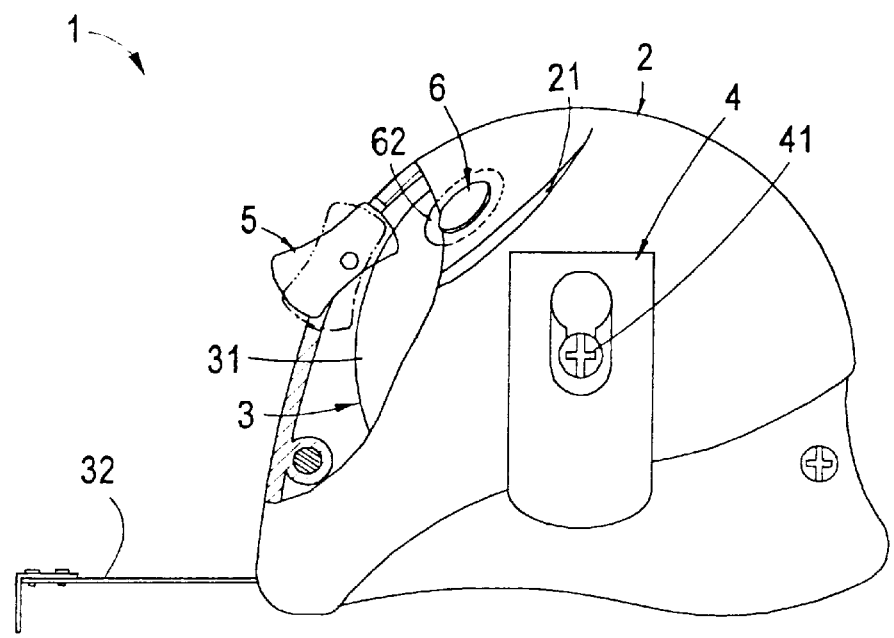
FIG. 5

INTERMITTENT STOP DEVICE FOR TAPE MEASURES

BACKGROUND OF THE INVENTION

1. Field of the Invention

The present invention relates to an intermittent stop device for tape measures.

2. Description of the Prior Art

Prior art relating to intermittent stop devices for tape measures includes Taiwanese Publication Nos. 287646, 281297, 289437, 303032 and 322784. In Publication Nos. 287646 and 281297, the intermittent stop device is a push button 13 (or 4) on the surface of the housing at one side of the tape measure. In practice, the user uses an index finger is used to press the push button continually so that the tape is rewind in an intermittent manner to achieve intermittent braking. In Publication Nos. 289437, 303032 and 322784, the intermittent device is a plate-like switch 12 (or 20) disposed at the bottom of the tape measure. By using an index finger or the middle finger to press the switch continually, the tape may be intermittently rewind to achieve intermittent braking.

As a matter of fact, apart from using the index finger or middle finger, the thumb can also be used to control the stop device, and manipulation is easier and more convenient, as demonstrated in the Publication No. 280417 (Attachment 6). In said Publication No. 280417, a pivot bolt A1 is mounted between two housing halves and pivotally provided in a pivot seat A2 of one housing B1. One end of the pivot bolt A1 is secured by la screw A2 . The other end thereof secures the other housing B2 by means of a screw A3 . In addition, the pivot bolt A1 and the housing B2 are integrally molded. The other end of the pivot bolt cooperates with a bolt A2 to secure the other housing B1. However, in the first type of tape measure housing, since one side thereof has the bolt A3 exposed on the outside, a sticker has to be used to conceal it. In the second type, a shallow depression will form on the surface of the housing B2 after the pivot bolt A1 and the housing B2 are molded into shape as a result of contraction and expansion. Although the depression cannot be easily observed with the naked eyes, it cannot receive the ink during printing.

SUMMARY OF THE INVENTION

According to an aspect of the present invention, a gradually raised gill portion is provided at a side edge of a top portion of the housing of a tape measure, the gill portion being adapted to be pressed by the user's thumb and slidably moved thereby. The gill portion is centrally provided with a through hole for passage of a stop switch therethrough. The stop switch has a base pad capable of contacting the side of a reel to achieve a frictional stop function.

A lock switch may further be provided at the top portion of the housing of the tape measure to secure the reel in position. The gill portion is provided at the side edge of the top portion of the housing near the lock switch so that the thumb may easily move between the lock switch and the stop switch.

Furthermore, a stop block may further be provided at the inner wall of the housing relative to the stop switch. The stop block is a projecting block and maintains a small clearance with the side wall of the reel. When the reel is subject to a side pressure, the stop block provides a support. Besides, it has a frictional stop function to prevent the reel from becoming eccentric.

BRIEF DESCRIPTION OF THE DRAWINGS

FIG. 3 is a schematic view illustrating the operation of the stop switch of the present invention;

FIG. 4 is another schematic view illustrating the operation of the stop switch of the present invention;

FIG. 5 is a schematic view of the lock switch of the present invention; and

DETAILED DESCRIPTION OF THE PREFERRED EMBODIMENT

Figure 1:
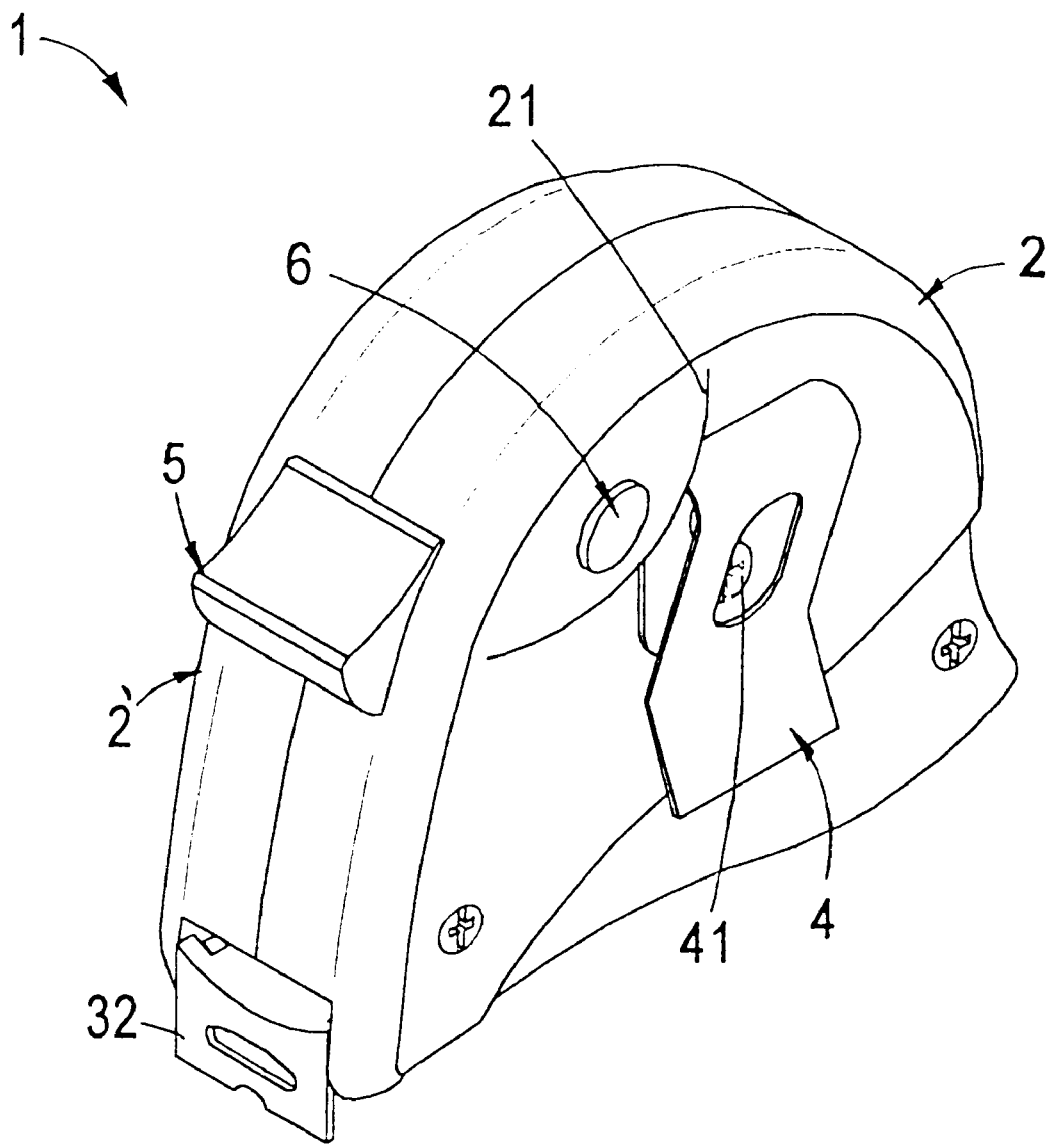
FIG. 1 is a perspective assembled view of the present invention.
Figure 2:
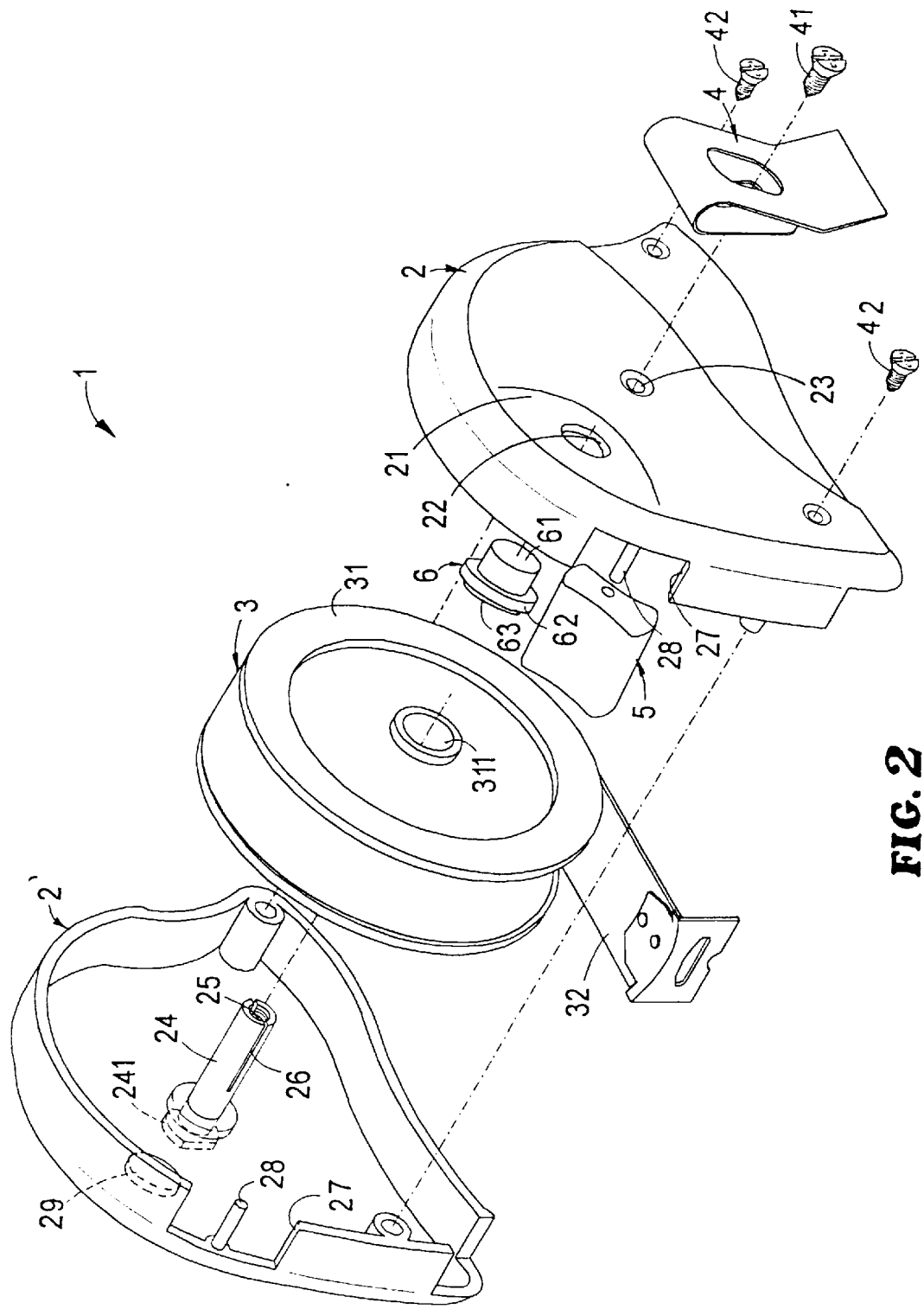
FIG. 2 is a perspective exploded view of the present invention.

With reference to FIGS. 1 and 2, the present invention comprises a tape measure 1 which includes two housing halves 2 and 2', a reel 3, a hook 4, a lock switch 5 (a lever type lock switch or a push type brake switch), and a stop switch 6.

The reel 3 includes a reel wheel 31, a torsion spring (not shown) at the center of the reel wheel 31, and a tape 32 wound round the circumference of the reel wheel 31. The reel 3 is provided between the two housing halves 2 and 2', while the lock switch 5 is disposed in a recess 27 at a portion top of a front edge of the housing halves 2 and 2' and secured by bolts 28 of the respective housing halves 2 and 2'. The lock switch 5 is provided to prevent the reel 3 from rotating. Furthermore, the center of one side of the housing half 2 is provided with the hook 4, which is secured by a bolt 41 (the above-mentioned structure being well known in the art). In addition, the housing halves 2 and 2' are secured in position by a plurality of screws 42.

The present invention is characterized in that when the housing halves 2 and 2' are coupled, a gradually raised gill portion 21 is formed on a side edge of the top portion of the housing. The gill portion 21 may be adapted for pressing by a thumb. Additionally, the center of the gill portion 21 is provided with a through hole 22 through which the stop switch 6 may pass to expose on the outside. The stop switch 6 includes a button 61 and a base pad 62 integrally formed. The base pad 62 has an area larger than that of the button 61 and can contact one side of the reel wheel 31 to achieve friction stop. In addition, in order to increase the frictional resistance, the bottom side of the base pad 62 may be provided with a rubber piece 63 or a portion of any material that can increase frictional resistance.

Furthermore, the housing half 2 of the tape measure 1 is centrally provided with a small hole 23, whereas the housing half 2' is internally provided with a pivot bolt 24 of metal for insertion into a central through hole 311 of the reel wheel 31. A rear end of the pivot bolt 24 has a screw hole 25 and a clamp groove 26. A screw 41 is passed firstly through the hook 4 and the small hole 23 and then into the screw hole 25 to better secure the assembly of the two housing halves 2 and 2'. The clamp groove 26 is provided for receiving one end of the torsion spring in the reel 3. The other end thereof is straddled inside the reel wheel 31 so that the reel wheel 31 may, due to the resilience of the torsion spring, may automatically rewired. As the above-described structure is well known in the art, it is discussed briefly herein. However, the pivot bolt 24 has one end provided with a bolt portion 241 which is embedded in an inner wall of the housing half 2' (see FIGS. 3 and 4). Due to the arrangement of the bolt portion 241, the surface of the outer side of the housing half 2' is maintained at a level surface after release from mold, without any formation of dish-like depressions. In this way, the surface of the outer side of the housing half 2' may be printed with patterns, word, etc., to enhance the overall appearance of the tape measure.

Referring to FIG. 3, which illustrates the operation of the stop switch, the gill portion 21 at the outer edge of the top portion of the housing 2 has the stop switch 6 disposed therein. The stop switch 6 is not being pressed by a thumb so that the base pad 61 is not in contact with the side wall of the reel 3, leaving a very small clearance L1. On the contrary, as shown in FIG. 4, when the user presses the stop switch 6 with his thumb, the base pad 61 of the stop switch 6 will contact the side wall of the reel 3 and generate friction, thereby stopping the tape 32 from rewinding to achieve stopping. If the user releases the stop switch 6, then the base pad 61 will not generate friction with the reel 3 so that the tape 32 may automatically rewind. And if the user presses the stop switch 6 intermittently, then the tape 32 will also intermittently rewind and stop. Such an intermittently rewinding function solves the problem in which the tape 32 may cut the fingers of the user if it is rewinding at a fast speed.

In addition, when the user presses the stop switch 6 with his thumb, apart from generating friction with the reel wheel 31, the stop switch 6 will also exert a biasing pressure on the reel wheel 31 so that there is some friction between the pivot bolt 24 and the reel wheel 31. In consideration of the above, a stop block 29 may be additionally provided at the inner wall of the housing half 2' relative to the stop switch 6 (see FIGS. 1, 3, and 4). The stop block 29 is a projecting block which maintains a small clearance L2 with the side wall of the reel wheel 31, whereby the stop block 29 may provide a support when the reel wheel 31 is being pressed sideways. Besides, it may provide a friction stop function to prevent the reel wheel 31 from becoming eccentric. In addition, the stop block 29 may be integrally formed with the housing half 2' or made of formed of non-skid material and secured at the inner wall of the housing 2'. The stop block 29 may be secured in varying manners such as using adhesive, hot fusion, ultrasonic fusion, etc. Referring to FIG. 5, which illustrates the operation of the lock switch of the present invention, the lock switch of the tape measure 1 may engage the tape 32 when being pressed by a thumb, so that the reel wheel 31 is stopped from further rotation. If the tape 32 has been pulled to a desired length and rewinding is not necessary, then the lock switch 5 may be pressed to fix the reel 3 in position without rotating and the tape 32 will not rewind. At this point, the tape measure is ready for measuring. To release the engagement of the reel 3, the lock switch 5 is pressed in an opposite direction so that the tape 32 may automatically rewind. In addition, a push type lock switch may be used to secure the reel 3 in position. Whatever the type of lock switch used, it belongs to the known art and knowledge and does not fall within the scope of the appended claims. It is worth mentioning, however, that the lock switch 5 and the stop switch 6 are very close in position, in which the lock switch 5 is provided at the top portion of the housing whereas the stop switch 6 is arranged at the side edge of the top portion of the housing. Therefore, the user's thumb may move between the two switches 5 and 6 with the other four fingers stationary, and the user may select any one of the two switches very swiftly. Furthermore, even if the tape measure 1 is not provided with a lock switch 5 and has only the stop switch 6, the tape measure 1 may still be used to brake the tape 32.

Figure 6:
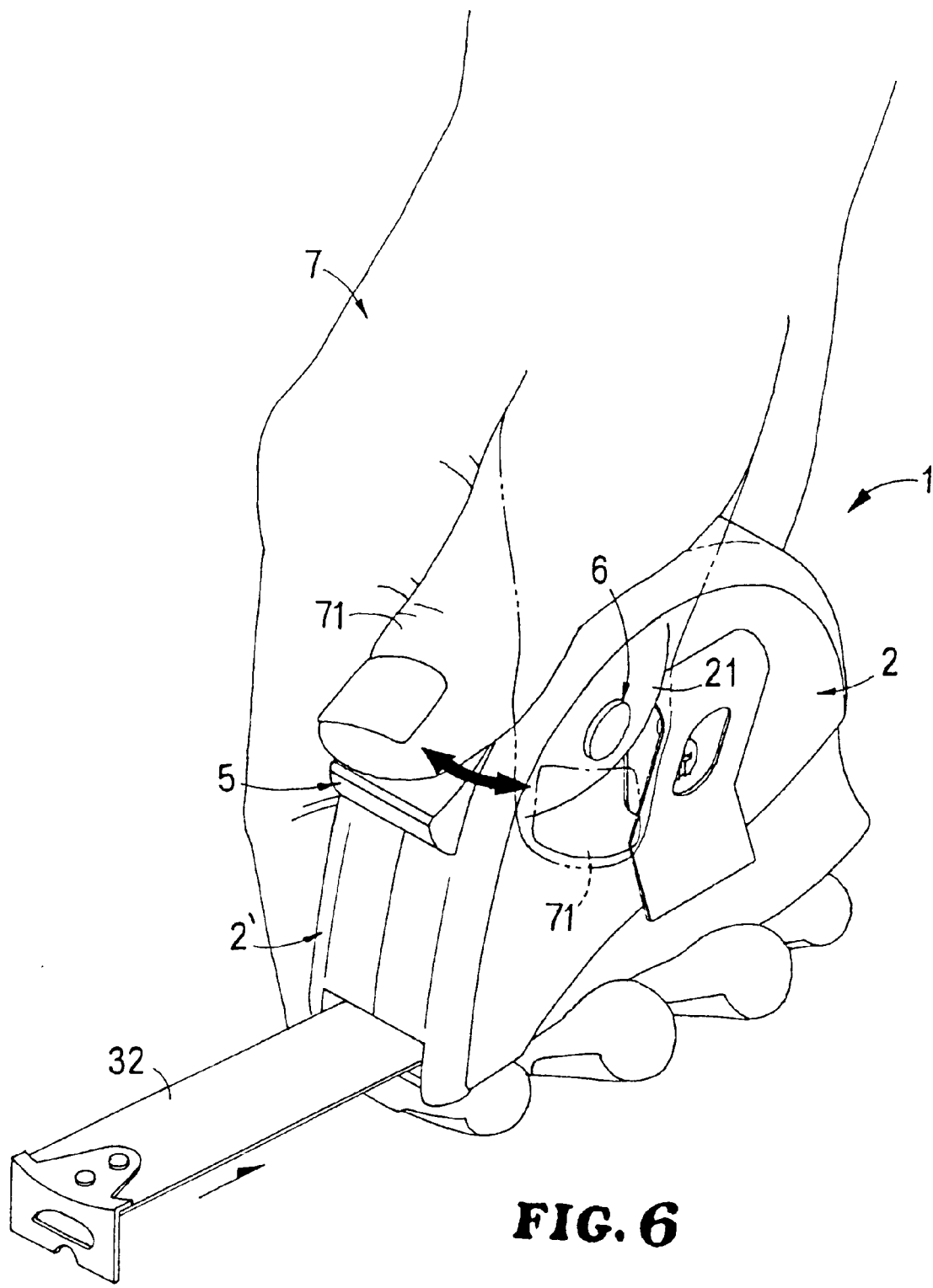
FIG. 6 is a schematic view of an embodiment of the present invention in use.

Referring to FIG. 6, which shows an embodiment of the present invention, the user holds the tape measure 1 with his palm 7 and uses his thumb 71 to press the lock switch 5 or the stop switch 6. Since the two switches 5 and 6 are located very close to each other, his thumb 71 may swiftly move between them. If it is desired to stop the rewinding of the tape 32, the user may press the lock switch 5 with his thumb 71. If it is desired to intermittently rewind the tape, the user may press the stop switch 6 intermittently. It can therefore be appreciated that the present invention is easy and convenient to operate.

Furthermore, the gill portion 21, the stop switch 6 and the hook 4 are all disposed on the same side of the tape measure 1, on the right side, to be adapted for use by right-handers. They may also be arranged on the left side to be adapted for use by left-handers.

The invention is naturally not limited in any sense to the particular features specified in the foregoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An intermittent stop device for tape measures, comprising a housing consisting of two housing halves, a reel provided inside said housing, a hook disposed at an outer side of said housing, and a stop switch provided at a top portion of said housing, in which said reel includes a reel wheel, a torsion spring provided at the center of the reel wheel for biasing the reel in a rewinding direction, and a tape wound round a circumference of said reel wheel, wherein:

a gradually raised gill portion is provided at a side edge of said top portion of said housing, said gill portion being adapted to be pressed by a thumb, said gill portion being centrally provided with a through hole through which said stop switch may pass to be exposed on the outside, and said stop switch has a base pad structured to releasably contact with the side of said reel wheel to achieve frictional stopping functions.

2. The intermittent stop device for tape measures as claimed in claim 1, wherein said stop switch includes a button and said base pad, said base pad having an area larger than that of said button, said button being structured to pass through said through hole of said gill portion.

3. The intermittent stop device for tape measures as claimed in claim 1, wherein said stop switch further includes a base piece at a bottom side thereof to enhance frictional resistance.

4. The intermittent stop device for tape measures as claimed in claim 1, wherein said top portion of said housing is provided with a lock switch structured for positioning said reel, said gill portion being provided at the side edge of said top portion of said housing at one side of said lock switch, so that said stop switch is located near said lock switch to facilitate pressing by the user's thumb.

5. The intermittent stop device for tape measures as claimed in claim 1, one housing half has a pivot bolt disposed at the center therein, said pivot bolt having one end provided with a screw hole and a clamp groove, and the other housing half is centrally provided with a through hole adapted to receive a screw which passes firstly through said through of said other housing half hole to be locked to said screw hole of said pivot bolt, whereby the outer surface of said housing may be level to facilitate printing thereon.

6. The intermittent stop device for tape measures as claimed in claim 5, wherein said pivot bolt has a bolt portion embedded in the inner wall of said housing.

7. The intermittent stop device for tape measures as claimed in claim 1 or 4, wherein a stop block is disposed at an inner wall of said housing relative to said stop switch, said stop block being a projecting block maintaining a small clearance with the side wall of said reel wheel.

* * * * *